United States Patent [19]
Wynn et al.

[11] Patent Number: 4,912,872
[45] Date of Patent: Apr. 3, 1990

[54] LIVE ANIMAL TRAP

[75] Inventors: Patrick Wynn, Albia; Roger Hopkins, Moravia, both of Iowa

[73] Assignee: Kness Manufacturing Co., Inc., Albia, Iowa

[21] Appl. No.: 403,643

[22] Filed: Sep. 6, 1989

Related U.S. Application Data

[63] Continuation of Ser. No. 242,637, Sep. 12, 1988, abandoned.

[51] Int. Cl.$^4$ ............................................. A01M 23/02
[52] U.S. Cl. ............................................. 43/61; 43/60
[58] Field of Search ...................................... 43/61, 60

[56] References Cited

U.S. PATENT DOCUMENTS 2,023,427 12/1935 Laughlin ................................. 43/61
4,590,704 5/1986 Volk ....................................... 43/61

FOREIGN PATENT DOCUMENTS 8605657 10/1986 World Int. Prop. O. .............. 43/61

Primary Examiner—Nicholas P. Godici
Assistant Examiner—Carmine Cuda
Attorney, Agent, or Firm—McKee, Thomte, Voorhees & Sease Zarley

[57] ABSTRACT

The animal trap of the present invention includes a housing having a top wall, a bottom wall, a closed rear end, and a door opening at the forward end. A door is hinged at the upper edge of the door opening and is adapted to swing downwardly by gravity from an open position to a latched position. A trip treadle is located near the rear end of the trap and is connected by a rod to the door. When the animal depresses the trip treadle, the rod releases the door so the door can fall from its open to its closed position. A latch mechanism is connected with the door which causes the door to automatically latch and be held in its closed position whenever the door falls by gravity from its open to its closed position. The latch may be opened without exposing the operator's hand to the vicinity of the cage, thereby making it safer to release the animal.

6 Claims, 2 Drawing Sheets

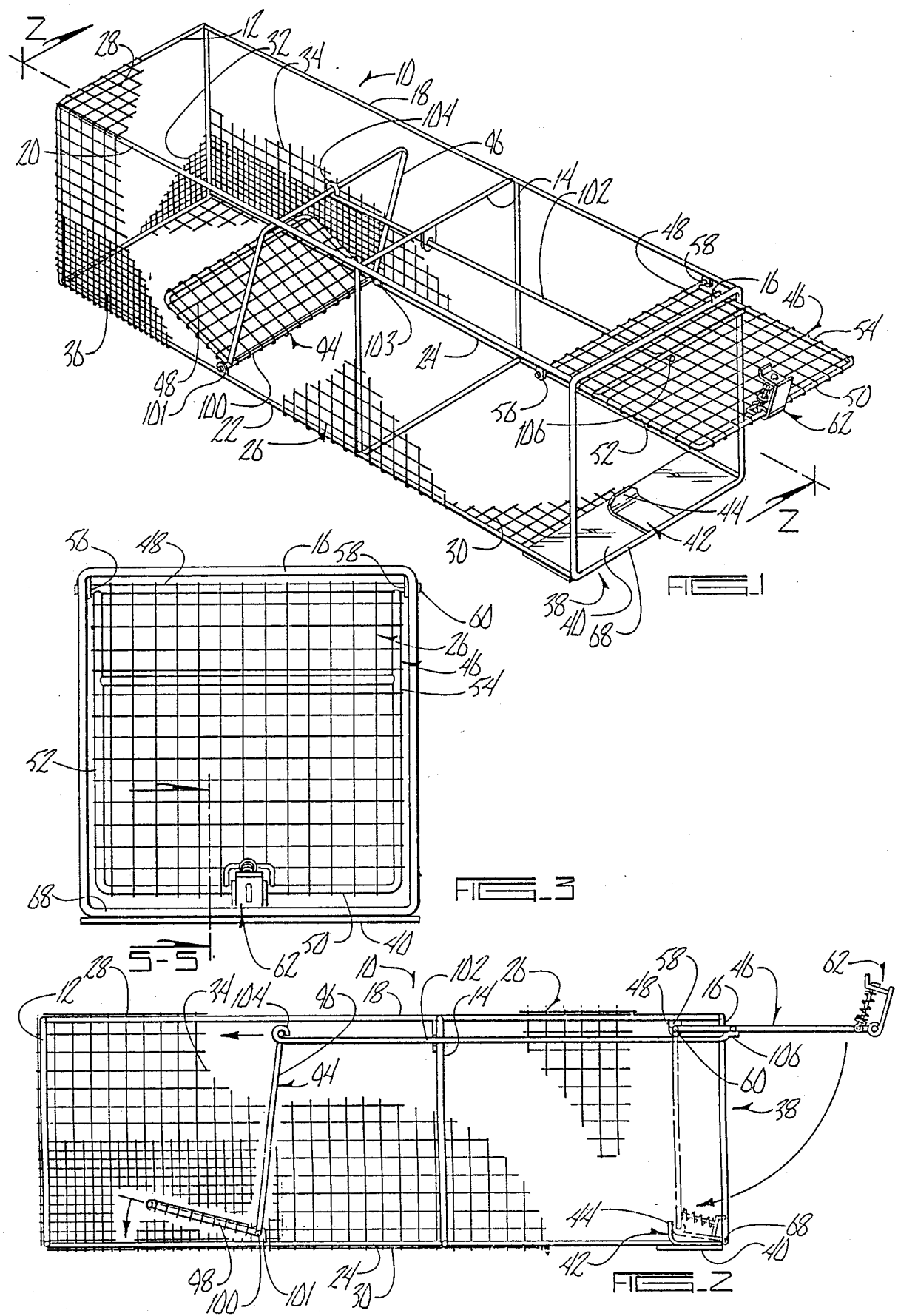

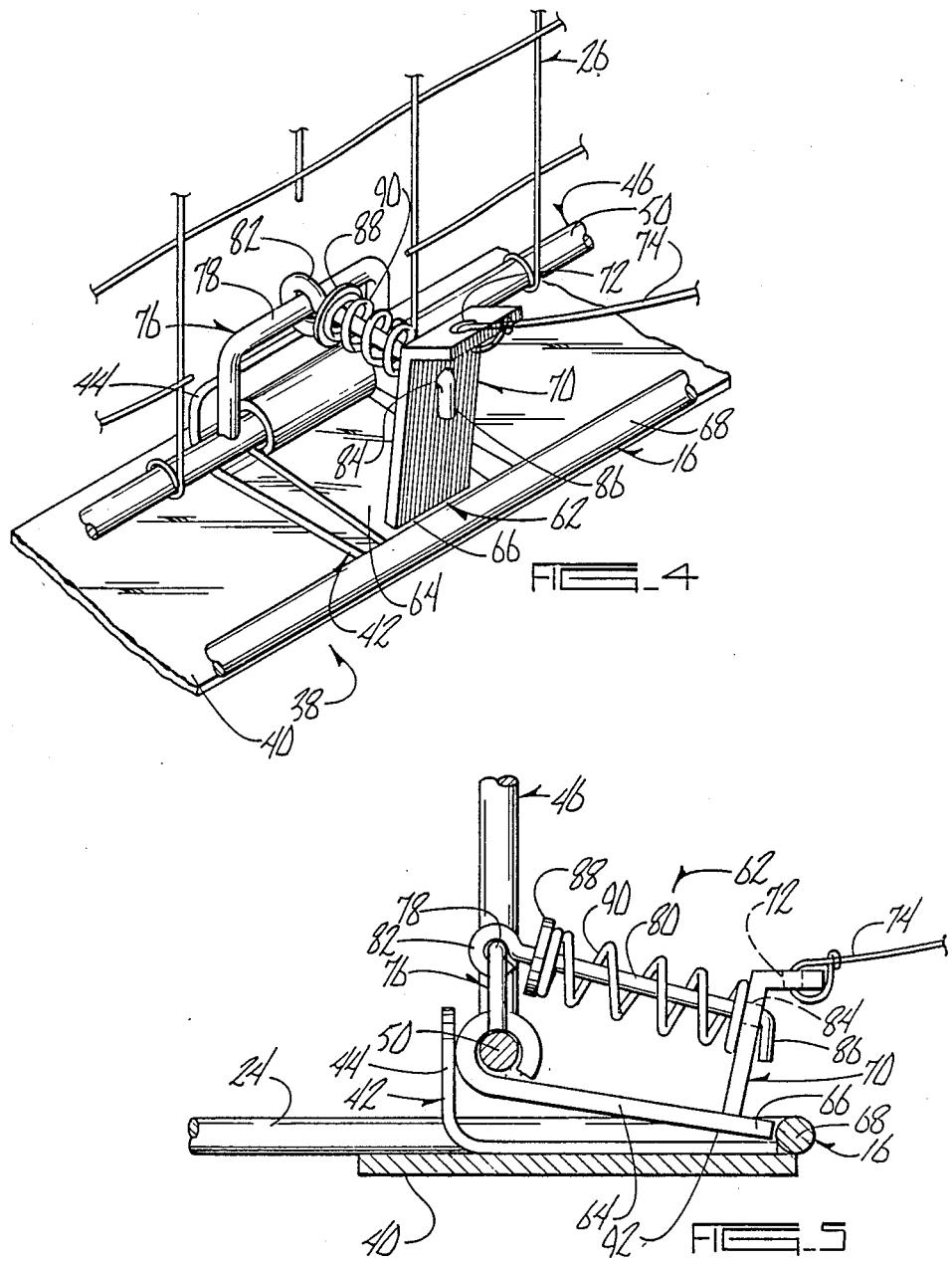

LIVE ANIMAL TRAP

This is a continuation of copending application Ser. No. 242,637 filed on Sept. 12, 1988 now abandoned.

BACKGROUND OF THE INVENTION

This invention relates to a live animal trap.

Various types of live animal traps have been provided which utilize an enclosed cage having a door at one end thereof. The door is raised and held in position by a trigger mechanism which can be actuated from within the cage. The animal enters the cage, touches the trip mechanism, and causes the door to close so as to enclose the animal in the trap.

Several problems are encountered with present animal traps of this type. Many prior art devices place the trip mechanism near the front of the cage so that the animal is often not completely within the trap before tripping the door. This results in the door not closing satisfactorily and permits the animal to escape on many occasions.

Another disadvantage of many prior art cages is that the linkage extending from the trip mechanism to the door is often in a position where it will be engaged by the animal accidentally before the animal is completely within the cage. Also, many prior art trip mechanisms involve complicated linkages which do not permit the instant release of the door.

Another disadvantage of prior art devices is the difficulty in opening the door after the animal has been trapped inside. In order to release the door to the cage, it is often necessary in prior art devices to place one's hand near the cage where the animal can scratch or bite. It is, therefore, often difficult to release the animal without endangering oneself.

Therefore, the primary object of the present invention is the provision of an improved live animal trap.

A further object of the present invention is the provision of an improved animal trap which utilizes a half trip treadle located to the rear of the cage so as to allow the animal to be totally in the trap before tripping the door.

A further object of the present invention is the provision of an animal trap which utilizes a trip rod extending from the trip treadle to the door wherein the trip rod is located near the top of the cage, thereby giving total freedom for the animal to move in the cage and eliminating the likelihood of accidental tripping of the door before the animal is completely within the cage.

A further object of the present invention is the provision of an improved animal trap, wherein the trip rod extends directly from the trip treadle to the door in a single unitary piece, thereby allowing instant release of the door.

A further object of the present invention is the provision of trap wherein the door is located to the extreme front of the cage, is hinged outwardly in the open position, and allows the animal to be completely inside the cage before it is released to close.

A further object of the present invention is the provision of an improved animal trap which utilizes a spring-loaded catch which will snap into the lock position and secure the door regardless of the position of the cage.

A further object of the present invention is the provision of a spring-loaded catch which permits the door to be opened by lifting up on an eyelet by hand, or which can be opened by use of an elongated cord or wire.

A further object of the present invention is the provision of an improved trap, wherein the operator can position himself several feet away from the trap and open the door with ease so as to release the animal with complete safety.

A further object of the present invention is the provision of an improved animal trap which includes a spring-loaded catch which has parts which can be easily replaced in the case of damage by the operator or by an animal.

A further object of the present invention is the provision of a trap having a spring-loaded catch which allows the operator to have his hands completely away from the trap when releasing the animal so as to improve the safety thereof.

A further object of the present invention is a provision of a device which is economical to manufacture, durable in use, and efficient in operation.

SUMMARY OF THE INVENTION

The present invention utilizes an elongated cage having a top wall, a bottom wall, opposite side walls, a rear wall, and a front opening having a hinged door therein. The door is hinged at the top of the opening about a horizontal axis and is moveable from an open position to a closed position, wherein it closes and covers the front opening of the cage.

Within the cage, near the rear end thereof, is a treadle which is pivotal about a horizontal axis from a set position to a released position in response to being stepped upon or pushed downwardly by an animal. Extending from the treadle to the door is an elongated rod. The rod engages the door and holds the door in its open position when the treadle is placed in its set position. However, when the treadle is depressed, the rod moves out of engagement with the door and gravity permits the door to fall to its closed position.

The door includes a latch thereon which automatically latches as the door falls to its closed position. The latch extends forwardly from the front door, and includes a grasping handle which is spaced forwardly from the door so as to be positioned out of reach of the animal within the cage. This handle can be lifted by the operator to open the door and release the animal from the cage. The operator's hand is not placed in danger of being scratched or bitten by the animal. Furthermore, a string, cord or rope may be attached to the handle so that the operator can be positioned remotely from the cage during the opening of the door, thereby providing a safety feature not present in prior art devices.

The positioning of the half trip treadle near the rear of the cage allows the animal to be totally within the trap before it trips the door and causes the door to close. Furthermore, the trip rod is located at the extreme top of the cage, thereby giving total freedom for the animal to move within the cage and eliminating the possibility of the animal accidentally tripping the door before it is completely within the cage. The trip rod is a single unitary piece which extends directly from the trip treadle to the door, and which permits instance release of the door when actuated by the animal.

By having the door located near the extreme front of the cage, and by hinging the door outwardly, it is possible to ensure that the animal is completely within the cage before the animal engages the treadle and releases the door.

The spring-loaded catch provides several advantages. It automatically snaps into the lock position securing the door regardless of the position of the cage. The cage may be completely rolled over, and the door will remain secured once the latch has engaged.

The door may be opened by lifting up on the eyelet by hand, or for safety precaution, it is sometimes desirable to use a cord or wire to lift the door. The operator may position himself several feet away from the trap and open the door with ease, thereby releasing the animal with safety. The compression spring, rod, and catch of the latch mechanism are designed so they can be easily replaced in case of damage by the operator or the animal.

BRIEF DESCRIPTION OF THE FIGURES OF THE DRAWINGS

FIG. 1 is a perspective view of the animal trap of the present invention.

FIG. 2 is a sectional view taken along line 22 of FIG. 1.

FIG. 3 is an end view of the animal trap showing the door in the closed position.

FIG. 4 is an enlarged, detailed perspective view of the latch mechanism of the present invention.

FIG. 5 is an enlarged sectional view taken along line 5—5 of FIG. 3.

DETAILED DESCRIPTION OF PREFERRED EMBODIMENT

Referring to the drawings the numeral 10 generally designates the animal trap of the present invention. Trap 10 includes three rectangular frame sections, 12, 14, and 16, which are interconnected by four longitudinal frame members, 18, 20, 22, and 24. Frame sections 12-16 and frame members 18-24 are covered by a wire mesh material 26 so as to enclose the trap and form a top wall 28, a bottom wall 30, a rear wall 32, and two opposite side walls 34, 36. A front door opening 38 is formed at the forward end of the device opposite end wall 32.

Extending across the bottom wall 30, adjacent the bottom of door opening 38, is a metal threshold plate 40 having a door stop 42 affixed thereto. Door stop 42 includes an upper projection 44 spaced inwardly from the forward end of bottom wall 30.

A door 46 includes an upper edge 48, a lower edge 50, and opposite side edges 52, 54. Upper edge 48 is hinged at 56, 58 for hinged movement about a horizontal axis 60 which is spaced inwardly from the forward end of trap 10 and which is aligned vertically above the upward projection 44 of door stop 42. Thus, as can be seen in FIG. 2, the door 46 swings about axis 60 from an upper set position shown in solid lines in FIG. 2 to a lower closed position shown in shadow lines in FIG. 2. When in its closed position, door 46 completely encloses the cage so that an animal therein cannot get out.

In order to secure door 46 in its closed position, a latch mechanism 62 is provided. Latch mechanism 62 includes a latch link 64 which is pivoted at one end about the bottom edge 50 of door 46 as shown in FIG. 5. Link 64 includes a forward end 66 which abuts against the bottom frame member 68 of rectangular frame section 16 as can be seen in FIGS. 4 and 5. Extending upwardly from the forward end 66 of link 64 is a handle 70 which includes an eyelet 72 for receiving a string or cord 74.

Attached to lower edge 50 of door 46 is an arch frame 76 having a horizontal portion 78. A spring pin 80 includes an eyelet 82 which is pivotally connected about horizontal portion 78 of arch frame 76. The other end of eyelet 80 extends through an opening 84 in handle 70 and terminates in a downward projection 86. A spring stop 88 is provided on spring pin 80 adjacent eyelet 82. A coil spring 90 surrounds pin 80 and is compressed between stop 88 and handle 70. The compression of spring 90 causes latch link 64 to be urged to the position shown in FIG. 5. Pivotal movement of latch link 64 in a counterclockwise direction from the position shown in FIG. 5 is resisted by spring 90. Thus, as can be seen in FIG. 5, the link 64 is held between bottom frame member 68 and upward projection 44 of door stop 42 so that the door is rigidly held in place when it is in its closed position. Spring 90 yieldably holds the latch link 64 in this position so that regardless of the position of the trap, the latch will remain in its latched position. This is true even if the animal causes the trap to be inverted or rolled over.

In order to release the latch mechanism, all that is necessary is to lift handle 70 upwardly against the bias of spring 90 so that the forward end 66 of link 64 will clear bottom frame member 68, thereby permitting the door to be lifted to its open position. It should be noted that handle 70 is located in spaced relation forward from door 46 so that one can grasp the handle 70 while at the same time keeping one's hands away from the cage so that the animal cannot scratch or bite the person's hand. Furthermore, the use of a string or cord 74 permits the operator to stand several feet away from the cage when releasing the animal so that safety can be maintained.

Another important feature of the latch mechanism is the camming action which occurs as the door is moving from its open position shown in FIGS. 1 and 2 to its closed position shown in FIGS. 3, 4, and 5. The bottom surface 92 of link 64 cams over the bottom frame member 68 as the door swings downwardly to its closed position. Spring 90 yields in response to this camming action, but once the forward edge 66 of link 64 clears bottom frame member 68, the spring 90 urges link 64 to its latched position shown in FIG. 5. Thus, a simple and reliable latching mechanism is provided for automatically latching the door as the door falls by gravity from its opened position to its closed position.

A treadle member 94 includes an upstanding arch frame 96 and a treadle platform 98 which extend in planes approximately perpendicular to one another and which are joined at an apex which coincides with a pivot rod 100 which is pivotally mounted in hinges 101 and 103 for pivotal movement about a horizontal axis. It should be noted that treadle member 94 is mounted closely adjacent the rear wall 32 of the trap so that the animal can enter the trap completely before encountering the platform 98.

An actuating rod 102 includes an eyelet 104 which is hinged to the upper portion of upstanding arch frame 96 for pivotal movement about a horizontal axis. Rod 102 includes a forward end 106 which is engageable with the door 46 to hold the door 46 in its open position as shown in FIG. 2. In this position, the treadle member 94 is positioned with treadle platform 98 elevated slightly, and with the forward end 106 of rod 102 supporting door 46 in its open position. An important feature of the present invention is the fact that rod 102 is closely adjacent the top wall 28 of the trap so that the animal can enter the trap without accidentally engaging rod 102 and tripping the door. This permits the animal to completely enter the trap before the animal encounters the treadle platform 98. The animal encounters the treadle platform 98 and pushes the platform downwardly. This causes rod 102 to move to the left as viewed in FIG. 2 thereby removing end 106 from supporting engagement with door 46. As a result, door 46 is permitted to quickly fall by gravity from the position shown in solid lines in FIG. 2 to the closed position shown in shadow lines in FIG. 2. The latch link 64 cams over the bottom frame member 68 and latches thereby closing the door and preventing the animal from exiting the trap.

The operator of the trap can at a later time carry the trap to a desired location, position himself remotely from the trap, and by means of cable 74 open the door to release the animal in a new environment.

The treadle platform 98 is of a dimension that is approximately one-half of the arch frame 96, and this permits the treadle 94 to be placed further toward the rear of the trap so as to ensure that the animal is completely within the trap before encountering treadle platform 98. The trip rod is located at the top of the cage, giving total freedom of the animal to move into the cage without accidentally tripping the door. The trip rod is a unitary member extending directly from the trip treadle to the door, thereby eliminating the linkages often used in prior art devices, and allowing instant release of the door in response to actuation of the treadle by the animal. By having the door located near the extreme front of the trap, and by hinging the door outwardly in its open position, it is possible to permit the animal to be completely inside the cage before the door is released.

The spring-loaded catch snaps into the locked position, securing the door regardless of the position of the cage. The cage may be completely rolled over, and the door will remain secured. The door may be opened by lifting up on the eyelet by hand or may be opened by positioning the operator several feet away and using a cable to release the animal. The spring 90, the spring pin 80, and the latch link 64 are designed so they can be easily replaced in case of damage by the animal or the operator. Thus, it can be seen that the device accomplishes at least all of its stated objectives.

What is claimed is:

1. An animal trap comprising:
    a housing having forward and rear ends and including a top wall, a bottom wall, opposite side walls, a rear wall at said rear end thereof, and a door opening at said forward end thereof;
    a door having a top edge, a bottom edge, and opposite side edges, said top edge being hinged to said top wall adjacent said forward end of said housing for pivotal movement about a horizontal door axis from an open position wherein said door extends above and forwardly from said door opening and is out of covering relation over said door opening for permitting access of an animal into the interior of said housing, to a closed position in covering relation over said door opening to prevent an animal within said housing from exiting through said door opening, the location of said door when said door is in said open position being such that said door will swing downwardly and rearwardly by gravity from said open to said closed position;
    a trip treadle pivotally mounted within said housing adjacent said rearward end thereof for pivotal movement about a horizontal treadle axis from a set position to a sprung position, said treadle being responsive to the weight of said animal thereon to move from said set position to said spring position;
    linkage means having a rear linkage end connected to said trip treadle and a forward linkage end adjacent said door, said forward linkage end being in supporting engagement with said door and holding said door in said open position when said treadle is in said set position, said forward linkage end moving out of supporting engagement with said door in response to movement of said treadle to said sprung position whereby said door will fall by gravity from said open to said closed positions;
    a latch stop connected to said bottom wall and positioned in spaced relation forwardly of said bottom edge of said door when said door is in said closed position;
    a latch link having a rear latch link end pivotally mounted to said door about a horizontal latch axis adjacent said bottom edge of said door, and having a forward latch link end extending forwardly from said bottom edge of said door and retentively engaging said latch stop when said door is in said closed position;
    a latch handle having a lower end connected to said forward end of said latch link and having an upper end extending upwardly therefrom, said upper end of said latch handle having an opening extending therethrough;
    a spring pin having a rear end pivotally connected to said door for pivotal movement about a spring pin axis spaced above said latch axis and having a forward end extending through said eyelet of said handle;
    spring means compressed between said rear end of said spring pin and said handle whereby said forward end of said latch link is pivotally movable about said latch axis against the bias of said spring means for movement from a latched position wherein said forward end of said latch link retentively engages said latch stop for holding said door in said closed position to an unlatched position out of engagement with said latch stop for freeing said door to move to said open position.

2. An animal trap according to claim 1 wherein said treadle includes a first treadle portion located adjacent and spaced upwardly from said bottom wall when said treadle is in said set position, said treadle including a second portion extending upwardly adjacent said top wall of said housing, said rear end of said linkage means being connected to said second portion of said treadle.

3. An animal trap according to claim 2 wherein said linkage means is positioned closely adjacent said top wall so as to permit said animal to pass beneath said linkage mans when said animal enters said forward end of said housing and moves toward said treadle.

4. An animal trap according to claim 1 wherein an elongated flexible member is attached to said latch handle.

5. An animal trap according to claim 1 comprising a door stop attached to said bottom wall of said housing adjacent said forward end thereof, said rear end of said latch link being adjacent said door stop and said forward end of said latch link being adjacent said latch stop when said door is in said closed position and said latch link is in said latched position.

6. An animal trap according to claim 1 wherein said linkage means comprises a unitary elongated rod.

* * * * *